Figure 1:
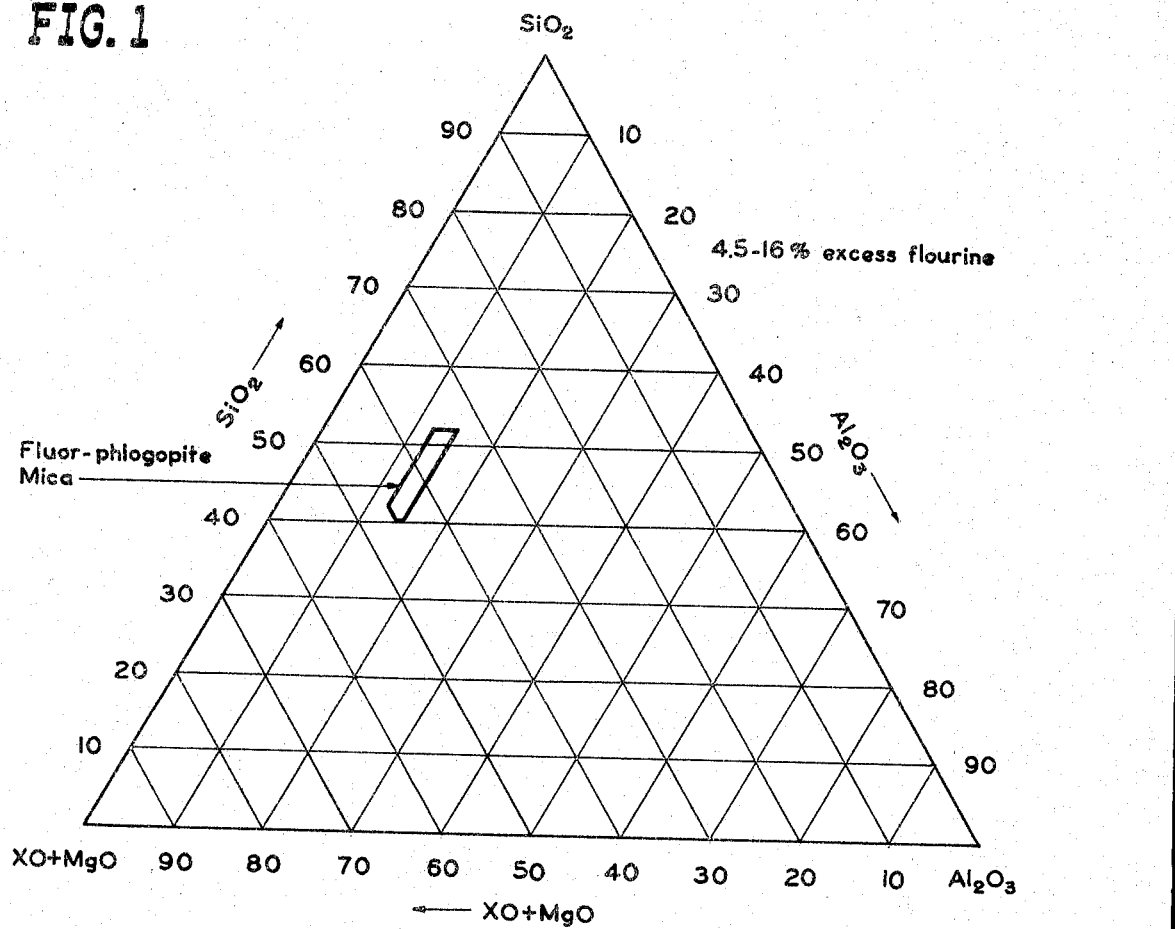

June 13, 1967 S. D. STOOKEY 3,325,265
METHOD OF MAKING SYNTHETIC MICA BODIES
Filed Aug. 8, 1963 2 Sheets-Sheet 2

INVENTOR.
Stanley D. Stookey
BY Clarence R. Patty Jr.
ATTORNEY

United States Patent Office 3,325,265
Patented June 13, 1967

3,325,265
METHOD OF MAKING SYNTHETIC MICA BODIES
Stanley D. Stookey, Corning, N.Y., assignor to Corning Glass Works, Corning, N.Y., a corporation of New York
Filed Aug. 8, 1963, Ser. No. 300,873
3 Claims. (Cl. 65—33)

This application is a continuation-in-part of my pending application, Ser. No. 55,616, filed Sept. 2, 1960, now abandoned.

This invention relates to a method for the production of a semicrystalline ceramic article which can be easily machined and which has favorable electrical properties and is stable at elevated temperatures.

A wide variety of ceramic materials are utilized in electrical and electronic applications as tube spacers, dielectric sheets in capacitors, and the like, because of many reasons, among which are their insulating characteristics and ability to withstand high temperatures. A natural material generally called mica is of particular value because in addition to other properties, it is found in laminated arrangement in large pieces or books which can be easily delaminated into thin sheets. However, because of its limited availability, exceedingly variable purity, and the fact that it is only rarely found in books capable of producing sheets over 100 sq. in., considerable effort has been expended to synthesize it.

The common micas of commerce comprise the muscovite variety which has the general formula $$K_2Al_4(Al_2Si_6)O_{20}(OH)_4$$

and the phlogopite variety which has the general formula $K_2Mg_6(Al_2Si_6)O_{20}(OH)_4$. However, because it is difficult to introduce the hydroxyl group into a crystalline structure produced by fusion of inorganic constituents at high temperatures, synthethic phlogopite micas have been produced in which fluorine has replaced the hydroxyl group and the resulting product is known as fluor-phlogopite.

In order for synthetic mica to be of utility it is necessary that it be produced in large sheets or shaped bodies. To accomplish this result, many processes have been devised which are based upon the theoretical consideration that by slowly cooling the fluor-phlogopite from the molten or liquid state through its freezing point, crystals will form and grow to useful dimensions. However, such processes have not resulted in the production of crystals which are usable per se and it has been necessary to perform additional processing of the mica to produce usable objects. These additional processes usually comprise mixing the synthetic mica flake with a binder, either organic or inorganic, and forming such mixture into bodies under pressure and/or elevated temperatures.

Furthermore, in another patent application filed of even data herewith by Klingsberg, Ser. No. 53,863, now abandoned and assigned to the same assignee as the present application, a new method of producing mica-like bodies comprising fluor-phlogopite is shown. This method comprises melting synthetic mica, forming the melt to the desired shape and simultaneously quenching it to form a glass, and thereafter heat treating it at a temperature of 500°–900° C. for at least one hour and subsequently heat treating the article at a temperature of between 1000° C. and the melting point of the synthetic mica for at least one hour. While this method produces satisfactory articles, the times required for the heat-treatment of the glass articles are of such long duration that it precludes processing articles such as sheets and tubes as they are formed from the molten batch without resorting to heat treatment equipment of such great length as to be commercially impractical.

The principal object of this invention is to simplify the method of producing easily machinable semicrystalline ceramic bodies comprising synthetic fluor-phlogopite.

Figure 2:
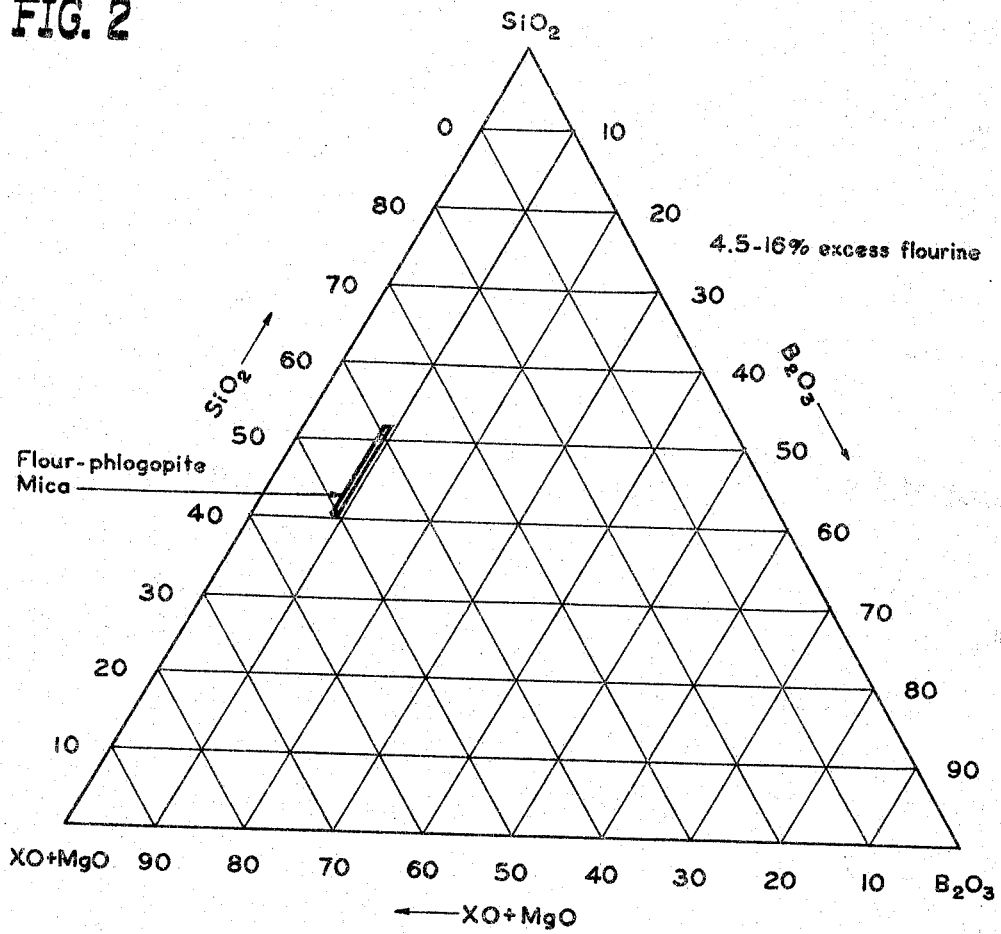

To aid in making the description of the product of this invention and the method of producing same more clear, the following drawings are submitted wherein:

FIGURE 1 represents a phase diagram setting forth the crystal phases present in the product of this invention resulting from the utilization of one group of compositions particularly useful in this invention; and FIGURE 2 depicts a phase diagram setting forth the crystal phases present in the product of this invention resulting from the utilization of another group of compositions particularly useful in this invention.

Figure 3:
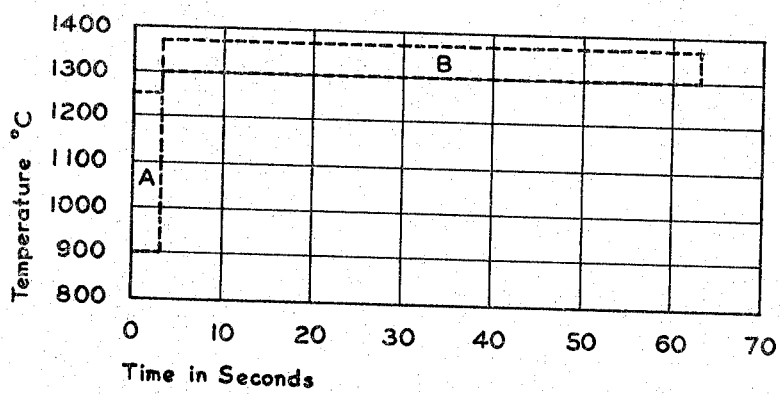

FIGURE 3 is a time-temperature curve illustrating the method of making the product of this invention.

As used in this application; the expression "semicrystalline ceramic body" is defined as a body resulting from controlled crystallization of a glass article in situ by heat treatment thereof. Such a body, also frequently known in the art a "glass-ceramic," is commonly produced by melting a glass-forming batch to which a nucleating or crystallization-promoting agent may be added, cooling this melt sufficiently rapidly to yield a glass or amorphous body, after which said glass body is heat treated at a particular temperature for a suitable length of time to convert the glass into a body composed of a multiplicity of crystalls dispersed substantially uniformly throughout a glassy matrix and comprising a major proportion of the mass of the body.

I have now found that the above object can be achieved by melting a batch for a fluor-phlogopite mica glass at a temperature of at least 1425° C., forming the resultant melt to an article of the desired shape with a maximum wall thickness of ¼″ and simultaneously cooling at least the surface of the article to a temperature of between 900° C. and 1250° C., reheating the article before the temperature thereof falls below 900° C. to a temperature of between 1300° C. and 1375° C. and thereatfer cooling the article. This cooling step converts at least the surface of the melt to a glass which is subsequently crystallized in situ as the temperature thereof is raised to 1300°–1375° C.

This improved method of producing such semicrystalline bodies is predicated upon my discovery that fluor-phlogopite crystallizes in a very desirable manner at temperatures of 1300°–1375° C. if it is exposed to a temperature below 1250° C. but in no event lower than 900° C. for as short a time as a few seconds before crystallization is allowed to proceed in the upper, crystallization temperature range. Bodies produced by my above-described method are comprised of spherulitic aggregates of plate-like crystals of fluor-phlogopite, having diameters up to about 1–2 millimeters and thicknesses of about 1–5 mils. These crystals appear to grow from points or crystallization sites, primarily occurring at and near the surface of the body which has been cooled to temperatures within the nucleation range, i.e., 900°–1250° C., a large number of crystals growing from each site and fanning out in three dimensions. The crystals grow throughout the body until they meet another crystal. The semicrystalline bodies resulting from this method, although readily machinable because they consist of at least 50% fluor-phlogopite, have strengths of up to 20,000 to 25,000 p.s.i. Furthermore, the exposure to a temperature below 1250° C., even though of brief duration, appears necessary in order to produce the unitary body inasmuch as cooling directly from the melt through the crystallization range results in a porous, cracked body containing larger crystals of fluor-phlogopite. Likewise, the body should not be cooled below 990° C. before crystallization occurs as such lower temperatures appear to cause the subsequent crystallization of phases other than fluor-phlogopite which either slow down the formation of the desired crystalline phase or are transformed to the fluor-phlogopite phase only by heat treatments at elevated temperatures of substantial duration. Although the time of holding the glass body within the nucleation range need be and is advantageously only a few seconds, certainly less than 10 and desirably but 2 or 3, it must be appreciated that the glass bodies may be held within the nucleation range for much longer periods, say several hours, without deleteriously affecting the structure of the final product. However, such extended dwell periods are uneconomical commercially and are of no practical value since no particular improvement in crystal development results therefrom. I have discovered that the crystallization of mica in situ in the glass occurs very rapidly when the temperature thereof is raised from the nucleating range to 1300°–1375° C., being substantially complete after one minute. However, here again, the glass body may be maintained at the temperatures of the crystallization range for extended periods of time but with no considerable improvement in crystal structure. This very shortness of time necessary for nucleation and final crystallization is of great commercial importance in the production of these semicrystalline bodies.

In its broadest terms, the method of making the semicrystalline synthetic fluor-phlogopite bodies of this invention comprises four principal steps: (1) melting a suitable glass-forming batch at a temperature of at least 1425° C.; (2) simultaneously shaping the melt to an article of a desired configuration and cooling at least the surface thereof to 900°–1250° C. for a time sufficient to cause nucleation of fluor-phlogopite crystals; (3) reheating the cooled portion of the article to 1300° C.–1375° C. for at least 1 minute; and (4) cooling the article to room temperature. The rate of reheating the article is not critical to the invention, the article frequently being merely plunged into a furnace maintained in the crystallization range, while the rate of cooling to room temperature is dependent only upon the size and configuration of the article, care being exercised to prevent cracks and breakage.

A preferred mode of my process comprises forming the melt to the desired shape between metallic surfaces, such as by pressing or rolling, and rapidly removing the formed object from contact with the forming means and allowing the formed object to cool to room temperature in an annealing kiln. Such method obviates the necessity of supplying external heat to the object after the forming operation to raise it to the crystallization temperature range as the interior portion of the object remains at a temperature substantially in excess of 1300° C. and thereby reheats the surface of the object up to such temperature range when the object is removed from the forming means. Obviously, a great many factors affect the length of time the object should remain in the mold in order that the surface is cooled within the lower temperature region while the interior of the body remains at a sufficiently high temperature that is possesses sufficient heat to reheat the surface of the body. Such factors include melting temperature, thickness of the body, operating temperature of the mold, heat conductivity of the mold, specific heat of the mold, weight of the mold, ambient temperature, and the like. However, in view of the fact that it is only necessary to cool the surface of the body below 1250° C. but above 900° C. for a length of time on the order of a few seconds, one skilled in the art can readily determine the optimum time for the body to remain in the mold by considering the nature of the forming equipment being utilized, the size of the body being formed, and the melting temperature being utilized. In this regard, the preferred method of practicing this embodiment of my invention comprises melting the batch materials at a temperature of 1500° C., forming a plate 6" square by ¼" thick in a steel mold operating at a temperature of about 500°–600° C. Bodies having thinner wall thicknesses should be left in the mold a correspondingly shorter time.

Of course, if desired the body can also be subjected to further forming operations while the body is in the crystallization range. For example, the body may be transferred from the initial mold wherein at least the surface of the body was cooled to a temperature within the nucleation range to a second mold of a high-temperature alloy maintained at a temperature within the crystallization range. Furthermore, a sheet of the synthetic mica which has been nucleated in the 900°–1250° C. temperature range may be reheated by external means, such as by radiation heaters or passing through a kiln, to a temperature in the crystallization range and then be subjected to one or more further forming operations, such as rolling, before crystallization is complete.

Articles having wall thicknesses in excess of about ¼" can not satisfactorily be produced by my above-described method because the interior portions do not satisfactorily crystallize. This is apparently due to the fact that the primary nucleation occurs in a thin surface layer which is rapidly cooled into the nucleation range while the nucleation within the remaining portion of the body of the article is only of secondary importance and hence is not capable per se of causing the desired crystallization.

Suitable compositions which can be melted to produce fluor-phlogopite mica glass comprise by weight on the oxide basis 6–13% of an oxide of at least 1 large cation selected from the group consisting of potassium, barium, and strontium, 25–33% MgO, a trivalent metal oxide in the indicated proportions selected from the group consisting of 12–15% $Al_2O_3$ and 8.5–9.5% $B_2O_3$, 40–52% $SiO_2$, and about 4.5–16% of fluorine, based on the total weight of the oxide constituents.

Compositions within the above range which may be utilized in carrying out the invention are illustrated by the batches of Table I which are stated in parts by weight.

TABLE I

|  | 1 | 2 | 3 | 4 | 5 | 6 |
|---|---|---|---|---|---|---|
| Sand | 137 | 133 | 136 | 269 | 239 | 222 |
| $Al_2O_3$ | 48 | 46 | 48 | 76 | | |
| MgO | 170 | 164 | 169 | 111 | 168 | 168 |
| Ga. Feldspar | 130 | 126 | 129 | | | |
| $K_2SiF_6$ | 116 | 151 | 122 | | 101 | 118 |
| $K_2CO_3$ | | | | 102 | 31 | 31 |
| $MgF_2$ | | | | 59 | 11 | 21 |
| $B_2O_3$ | | | | | 50 | 50 |

|  | 7 | 8 | 9 | 10 | 11 |
|---|---|---|---|---|---|
| Sand | 263 | 240 | 266 | 257 | 297 |
| $Al_2O_3$ | 74 | 68 | 75 | 73 | 83 |
| MgO | 122 | 112 | 124 | 120 | 138 |
| $BaCO_3$ | | | 89 | 86 | 46 |
| $SrCO_3$ | 97 | 89 | | | |
| $MgF_2$ | 79 | 157 | 69 | 98 | 43 |

To obtain homogeneous glasses, the batches are melted at about 1435°–1500° C. for about 2–7 hours in crucibles, pots or tanks depending upon the size of the melt. The melts are quite fluid and hence do not require the use of fining agents.

The exact composition of fluorine-containing glasses cannot be calculated with accuracy on the conventional oxide basis from their batches because some fluorine is lost by volatilization during melting. The amount of fluorine so lost depends upon a number of factors such as melting time and temperature, batch materials utilized, and the composition of the resulting melt, but, in view of the fact that the present compositions melt rapidly at relatively low temperatures relatively little error will be introduced in assuming that 80% of the added elemental fluorine remains in the final composition. Furthermore, it is customary to set forth the amount of fluorine contained in such oxide compositions as an amount in excess of the oxide composition; the total of the oxides being 100% by weight.

The batches set forth in Table I when melted, result in the respective glass compositions shown in Table II and calculated in weight percent on the oxide basis; the corrected amount of fluorine being stated separately as is customary, as 80% of the calculated amount as referred to above. The accuracy of this procedure is sufficient for defining the compositions which are suitable for the present purpose, especially in view of the wide range of fluorine permissible as more completely explained hereinafter.

TABLE II

|  | 1 | 2 | 3 | 4 | 5 | 6 |
|---|---|---|---|---|---|---|
| $K_2O$ | 12.6 | 11.8 | 13.5 | 12.3 | 11.4 | 12.8 |
| MgO | 30.1 | 30.4 | 32.2 | 26.6 | 31.6 | 32.6 |
| $Al_2O_3$ | 12.6 | 12.7 | 12.9 | 13.4 |  |  |
| $B_2O_3$ |  |  |  |  | 9.0 | 9.0 |
| $SiO_2$ | 44.7 | 45.1 | 41.4 | 47.7 | 48.0 | 45.6 |
| F | 8.5 | 11.4 | 9.0 | 5.1 | 8.5 | 10.6 |

|  | 7 | 8 | 9 | 10 | 11 |
|---|---|---|---|---|---|
| SrO | 12.4 | 12.4 |  |  |  |
| BaO |  |  | 12.4 | 12.4 | 6.3 |
| MgO | 26.6 | 26.6 | 26.6 | 26.6 | 28.4 |
| $Al_2O_3$ | 13.5 | 13.5 | 13.4 | 13.4 | 14.3 |
| $SiO_2$ | 47.6 | 47.6 | 47.6 | 47.6 | 50.8 |
| F | 7.0 | 15.2 | 6.0 | 8.9 | 3.6 |

The above specified ranges of constituents are critical for several reasons. Too little $SiO_2$ and/or $B_2O_3$ or too much $Al_2O_3$ and/or fluorine causes the molten glass to devitrify before it can be shaped. On the other hand, too much $SiO_2$ and/or $B_2O_3$, too little $Al_2O_3$ and/or fluorine or amounts of the other constituents outside of the specified ranges prevent the formation of suitable crystals upon heat-treatment of the shaped article.

FIGURE 1 represents a phase diagram designating the crystalline phase present in the semicrystalline ceramic article resulting from the process of the invention utilizing an arbitrary three-component system, $$(XO + MgO) - Al_2O_3 - SiO_2$$

wherein X represents at least one large cation selected from the group consisting of potassium, barium, and strontium. Fluorine, although present in this composition, is considered as in excess of the total oxide composition for purposes of illustrating the nature of the crystalline phases. The MgO component is combined with the XO as these two constituents are more closely related to each other than with the others.

FIGURE 2 represents a phase diagram designating the crystalline phase present in the semicrystalline ceramic article resulting from the process of the invention where $B_2O_3$ is substituted for $Al_2O_3$ in the arbitrary three-component system described above with relation to FIGURE 1.

FIGURE 3 consists of a time-temperature curve of the heat treatment step of the invention. Thus, after melting the batch at a temperature of at least 1425° C., the melt is simultaneously shaped into a desired article and at least the surface thereof is cooled to between 900°–1250° C. The article is maintained at this temperature for at least 2 seconds after which it is plunged into a furnace held at 1300°–1375° C., maintained therein for 1 minute, and then removed from the furnace to cool in air. In this chart, A represents the 2-second nucleation period and B the 1-minute crystallization period.

What is claimed is:

1. The method of making a machinable semicrystalline ceramic body of fluor-phlogopite mica comprising melting a glass-forming composition at a temperature of at least 1425° C. consisting essentially, as calculated from the batch in weight percent on the oxide basis, of 6–13% of an oxide of at least one large cation selected from the group consisting of potassium, barium, and strontium, 25–33% MgO, a trivalent metal oxide in the indicated proportion selected from the group consisting of 12–15% $Al_2O_3$ and 8.5–9.5% $B_2O_3$, 40–52% $SiO_2$, and 4.5–16% fluorine, based on the total weight of the oxide constituents, forming the melt to an article of the desired shape with a maximum wall thickness of ¼″ and simultaneously cooling at least the surface of the article to a temperature of between 900° C. and 1250° C. for a time sufficient to cause nucleation of fluor-phlogopite crystals, reheating the cooled portion of the article to a temperature of between 1300° C. and 1375° C. for at least 1 minute, and thereafter cooling the article.

2. The method according to claim 1 wherein the time sufficient to cause nucleation is at least 2 seconds.

3. The method of making a machinable semicrystalline ceramic body of fluor-phlogopite mica comprising melting a glass-forming composition at a temperature of at least 1425° C. consisting essentially, as calculated from the batch in weight percent on the oxide basis, of 6–13% of at least one large cation selected from the group consisting of potassium, barium and strontium, 25–33% MgO, a trivalent metal oxide in the indicated proportion selected from the group consisting of 12–15% $Al_2O_3$ and 8.5–9.5% $B_2O_3$, 40–52% $SiO_2$, and 4.5–16% fluorine, based on the total weight of the oxide constituents, forming the melt to an article of the desired shape with a maximum wall thickness of ¼″ and simultaneously cooling the surface of the article to a temperature of between 900° C. and 1250° C. before the interior of the article is cooled below a temperature of about 1300° C., permitting the heat of the interior portion of the article to reheat the cooled surface to a temperature in excess of 1300° C., maintaining the temperature of the article above 1300° C. for at least 1 minute, and thereafter cooling the article.

References Cited

UNITED STATES PATENTS 3,149,947 9/1964 Eppler et al. _____ 106—39 X
3,149,982 9/1964 Eppler _____ 106—39

OTHER REFERENCES

Rumanian article "Mase de ceramica fina obtinute prin cristalizerea sticlelor" (portelan din sticla) by N. Lungu and D. Popescu-Has, in Industria Usoara, Vol. 5, February 1958; pages 63–65 entitled "Fine Ceramic Materials Obtained From Crystallized Glass." (Porcelain From Glass) CZ. 666.5.

German Article "Vitrokeram" written by Wilhelm Hinz published in Silikat Tech., vol. 10, pp. 119 to 122 in March 1959 by German Acad. of Science. Library No. LCTP 785.S5.

Literature reference of Kendall and Spraggon. This article is published in "Proceed. of Intern. Cong. of Pure and Applied Chemistry" 1947, pp. 167–170.

DONALL H. SYLVESTER, *Primary Examiner.*

F. W. MIGA, *Assistant Examiner.*